(12) United States Patent
Woodham (10) Patent No.: US 6,779,649 B2
(45) Date of Patent: Aug. 24, 2004

(54) ROTARY LOG SINGULATOR WITH STAGING CAM SURFACES

(75) Inventor: Van Woodham, Daphne, AL (US)

(73) Assignee: PSI Sales, Inc., Theodore, AL (US)

( * ) Notice: Subject to any disclaimer, the term of this patent is extended or adjusted under 35 U.S.C. 154(b) by 0 days.

(21) Appl. No.: 10/447,614

(22) Filed: May 29, 2003

(65) Prior Publication Data

US 2003/0205444 A1 Nov. 6, 2003

Related U.S. Application Data

(63) Continuation-in-part of application No. 09/904,397, filed on Jul. 12, 2001
(60) Provisional application No. 60/217,845, filed on Jul. 13, 2000.

(51) Int. Cl.$^7$ .................. B65G 25/00; B65G 37/00; B65G 47/04; B65G 47/34; B65G 47/46
(52) U.S. Cl. ................ 198/463.5; 198/459.5; 198/608; 414/745.7; 414/745.9
(58) Field of Search .......... 198/463.5, 459.5, 198/463.6, 459.6, 459.7, 608; 414/745.7, 745.9

(56) References Cited

U.S. PATENT DOCUMENTS

| | | | |
|---|---|---|---|
| 2,263,811 A | 11/1941 | Lipkin | |
| 2,993,606 A | * 7/1961 | Helstrom | 198/463.5 |
| 3,157,071 A | * 11/1964 | Pachell | 198/608 |
| 3,279,625 A | 10/1966 | McConnell et al. | |
| 3,282,444 A | 11/1966 | McConnell | |
| 3,330,401 A | 7/1967 | Ahlstedt | |
| 3,400,837 A | 9/1968 | Dalik | |
| 3,584,726 A | 6/1971 | Hartzell | |
| 3,757,960 A | 9/1973 | Hill et al. | |
| 4,057,138 A | 11/1977 | Grebe | |
| 5,062,523 A | 11/1991 | Lenz | |
| 5,217,106 A | * 6/1993 | Bunney | 198/463.5 |
| 5,257,898 A | 11/1993 | Blume | |
| 5,423,417 A | 6/1995 | Redekop | |
| 6,386,823 B1 | 5/2002 | Perreault | |
| 2002/0046924 A1 | 4/2002 | Woodham | |

FOREIGN PATENT DOCUMENTS

JP 52033269 A 3/1977

* cited by examiner

Primary Examiner—Gene O. Crawford
(74) Attorney, Agent, or Firm—Alston & Bird LLP (57) ABSTRACT

A log singulator and associated method for conveying and controllably discharging logs are provided. The singulator has a plurality of rotatable lifters with outwardly-extending arm members that contact the logs with a leading side to convey the logs to successive positions, for example, along a log cradle structure. The logs are conveyed to a discharge surface, which can be disposed at a declined angle so that the logs thereon tend to roll toward a discharge position. Discharge lifters, which are configured to discharge the logs from the discharge surface, have arm members that define angled cam surfaces on their trailing sides. The cam surfaces contact and retain the logs on the discharge surface until the logs reach the predetermined discharge position. Thus, the logs can be controllably discharged, for example, at a desired time.

24 Claims, 7 Drawing Sheets

ROTARY LOG SINGULATOR WITH STAGING CAM SURFACES

CROSS-REFERENCE TO RELATED APPLICATIONS

This application is a continuation-in-part of copending U.S. patent application Ser. No. 09/904,397, filed on Jul. 12, 2001, which is a non-provisional of provisional Application No. 60/217,845 filed Jul. 13, 2000, each of which is hereby incorporated herein in its entirety by reference.

BACKGROUND OF THE INVENTION

1) Field of the Invention

The present invention relates to the processing of logs and, more particularly, to log singulators used for culling logs and conveying the logs to a further process such as a conveyor that transports the logs to a saw mill.

2) Description of Related Art

Log singulators for conveying logs are used in the logging industry, for example, to singulate individual logs from a group of logs so that the logs can be processed. For example, U.S. Pat. No. 5,423,417 to Redekop, dated Jun. 13, 1995, discloses a log singulator for sorting, feeding and indexing in a downstream direction a stack of logs into a stream of logs. The singulator has a first notched step and a first set of collectively actuable lift arms pivotable about a first axis, and a second set of collectively actuable lift arms downstream of the first set of lift arms, actuable independently of the first set of collectively actuable lift arms and pivotable about a second axis. The first set of lift arms are actuable from a lowered position to a raised position whereby the first set of lift arms are engageable with a log at a first engagement point to raise the log from the stack of logs. The first axis is downstream of the first engagement point relative to the direction of movement of the logs. The first axis is generally below the first notched step, and the first notched step is adapted to receive and hold the stack of logs. In the raised position, the first set of lift arms position the log so as to deposit the log into a second notched step downstream of the first notched step. The second set of lift arms is actuable from a lowered position to a raised position such that the second set of lift arms can be engaged with the log in the second notched step at a second engagement point to raise the log from the second notched step. In the raised position, the second set of lift arms position the log so as to deposit the log from the log singulator.

U.S. Pat. No. 5,174,351 to Lindenblatt, et al., dated Dec. 29, 1992, discloses an ending apparatus for positioning elongate objects comprising, in combination, object singulating equipment for separating a plurality of elongate objects in an inlet area into single objects while moving the objects in a first direction to an outlet area, and object support rollers intermediate the inlet and outlet area for supporting a separated, single elongate object. The object support rollers are adapted to move the elongate object in a second direction toward a reference surface independently of the object's movement in the first direction on the singulating device. The reference surface stops movement of the elongate object to establish a predetermined position for the elongate object. Establishing the position of the object permits more efficient handling during further processing.

U.S. Pat. No. 4,585,114 to Liliano, dated Apr. 29, 1986, discloses an apparatus for the transfer of mandrels from a lube conveyer to a parallel mandrel pre-insertion line which comprises a plurality of transfer devices. Each transfer device has an arm for the direct transfer of the mandrels which is disappearingly movable transversely between the conveyor and the line. A further pair of arms, one fixed and one movable, has upper saw-tooth profiles that cooperate to effect a stepwise displacement of the mandrels between the conveyor and the line.

While these devices may be suitable for the purposes for which they were designed, they would not be as suitable for the purposes of the present invention, as hereinafter described.

BRIEF SUMMARY OF THE INVENTION

The present invention provides a log singulator and associated method for conveying and controllably discharging logs. According to one aspect of the invention, the singulator has a plurality of rotatable lifters, including discharge lifters. Each of the lifters has outwardly-extending arm members that contact the logs with a leading side, and the lifters are spaced apart so that the lifters convey the logs to successive positions, for example, along a log cradle structure, to a discharge surface. The arm members of the discharge lifters also define trailing sides that define angled cam surfaces for contacting and retaining the logs on the discharge surface. The cam surfaces retain the logs on the discharge surface until the logs reach a predetermined discharge position so that the logs can be controllably discharged. The discharge surface can extend at a declined angle so that a log conveyed thereto by a respective arm member tends to roll toward a discharge position and the log is retained on the discharge surface by the cam surface of the arm member next in the rotational direction of the lifter. Thus, the logs can be controllably discharged from the singulator as desired.

According to another aspect of the invention, the log cradle structure is inclined and defines a plurality of cradles for receiving the logs. A rotational actuator rotates the lifters so that the each arm member rotates between a raised position, in which the arm member extends above the log cradle structure, and a lowered position, in which the arm member extends substantially below the log cradle structure. The logs are conveyed horizontally and lifted by the arm members between successive cradles of the log cradle structure. The discharge surface extends at a declined angle so that the logs on the discharge surface tend to roll toward a discharge position and are retained on the discharge surface by the cam surfaces of the arm members. Thus, the logs can be controllably discharged from the discharge surface, for example, from the edge of the discharge surface. The cam surfaces of each arm member can define an angle of between about 30 and 50 degrees with the trailing side of the arm member. According to one embodiment, the lifters are arranged in sets of at least two, each set being collinearly arranged. Each lifter can be rotatable through a range of motion of at least 360 degrees.

The present invention also provides a method of conveying logs. According to one method of the present invention, a plurality of the lifters are rotated so that a log is successively pushed and conveyed along the lifters to the discharge lifters. The discharge lifters are rotated so that leading sides of the radial arm members of the discharge lifters push the log onto the discharge surface. The log is retained on the discharge surface by cam surfaces of the arm members that are successively next in the rotational direction of each discharge lifter. The discharge lifters then rotate so that the cam surfaces are adjusted below the discharge surface, thereby discharging the log from the discharge surface, for example, at a predetermined time and/or onto a predetermined portion of the conveyor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
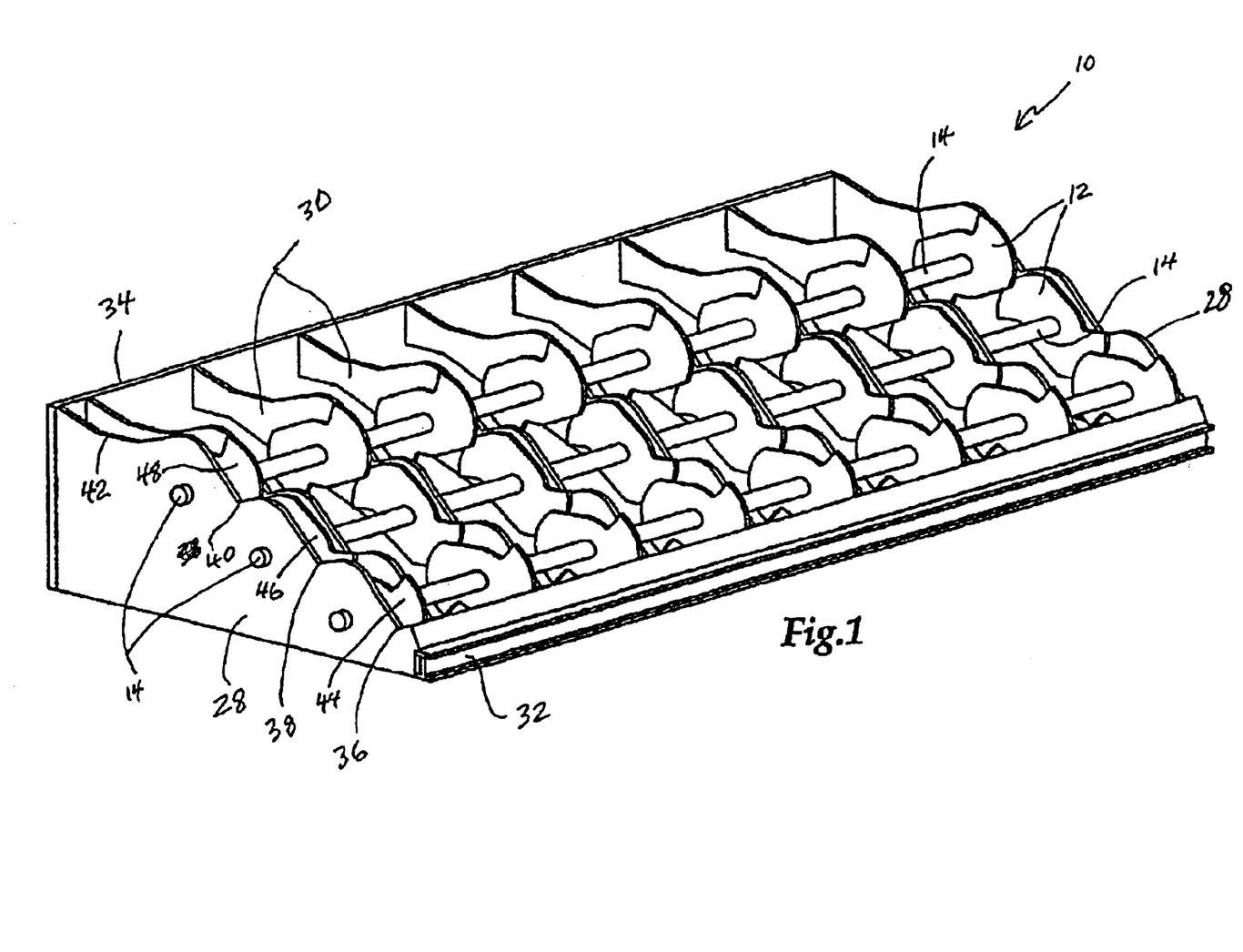
FIG. 1 is a perspective view of a log singulator according to one embodiment of the present invention.

Turning now to the figures, and in particular, FIG. 1, there is shown a log singulator 10 according to one embodiment of the present invention. The log singulator 10 has a plurality of lifter arms 12, each of which is rotatable throughout a range of at least 360 degrees. The lifter arms 12 are arranged in sets 44, 46, 48, each set 44, 46, 48 being rotatably mounted on one of a plurality of axles 14. The log singulator 10 also includes a pair of sidewalls 28 and a plurality of vertically standing support members 30 held upright by a cross member 32 on the first, or front, lower end of the log singulator 10 and a second, or back, cross member 34 on the rear or upper end of the log singulator 10. The axles 14 are journalled through the sidewalls 28 and the support members 30 and equipped with bearing means as understood by one skilled in the art. Means for rotating the multiple axles 14 in a counterclockwise and/or clockwise direction can also be provided.

The log singulator 10 operates by moving logs in a stepwise fashion up the log singulator 10 by first moving a log from a first log cradle 36 to a second, higher log cradle 38, then up to a third, higher log cradle 40, and then further up onto a fourth, highest log cradle station or singulator station 42 where the log can then be moved by other machinery for further processing. The first set 44 of lifter arms 12 move the log from the first log cradle 36 downstream to the second log cradle 38 where the second set 46 of lifter arms 12 contacts the log to move the log downstream to the third log cradle 40, where the third set 48 of lifter arms 12 moves the log downstream to the fourth log cradle station 42.

Figure 2:
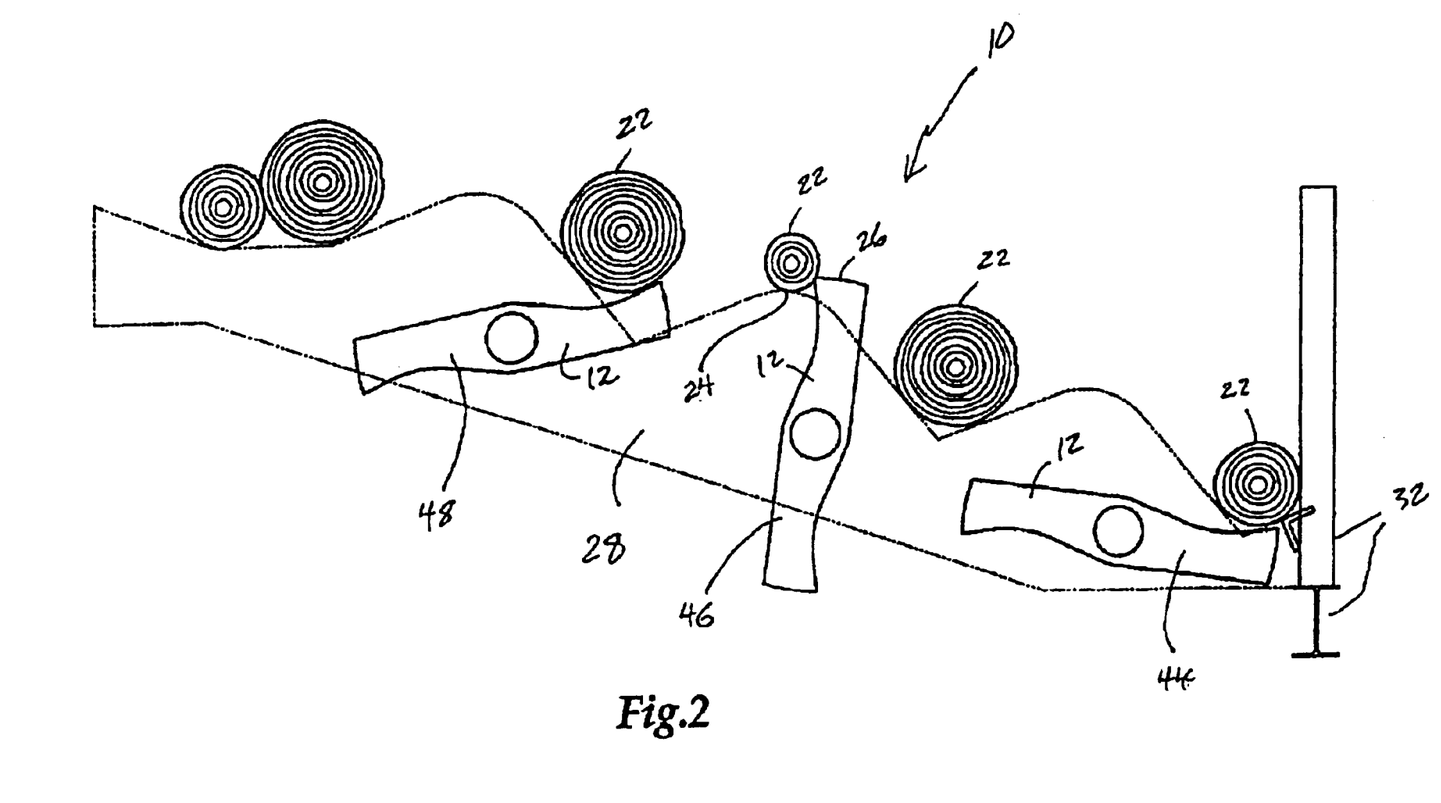
FIG. 2 is a side elevation view of a log singulator according to another embodiment of the present invention.

FIG. 2 illustrates a side view of the log singulator 10, showing a sidewall 28 along with one of the lifter arms 12 of the first, second, and third sets 44, 46, 48. It can be seen here that the lifter arms 12 rotate 360 degrees. As illustrated by the lifter arm 12 of the second set 46, the lifter arms 12 extend beyond the top points 24 of the side walls 28, which define the log cradles 36, 38, 40, 42. Thus, the lifter arms 12 will positively push logs 22 over the top points 24, which can be rounded. Tips 26 of the arms 12 can remain in contact with the logs 22 in order to positively push the logs 22 to the next higher or downstream log cradle 38, 40, 42, i.e., to the left in FIG. 2, in a direction away from the front cross member 32.

Figure 3:
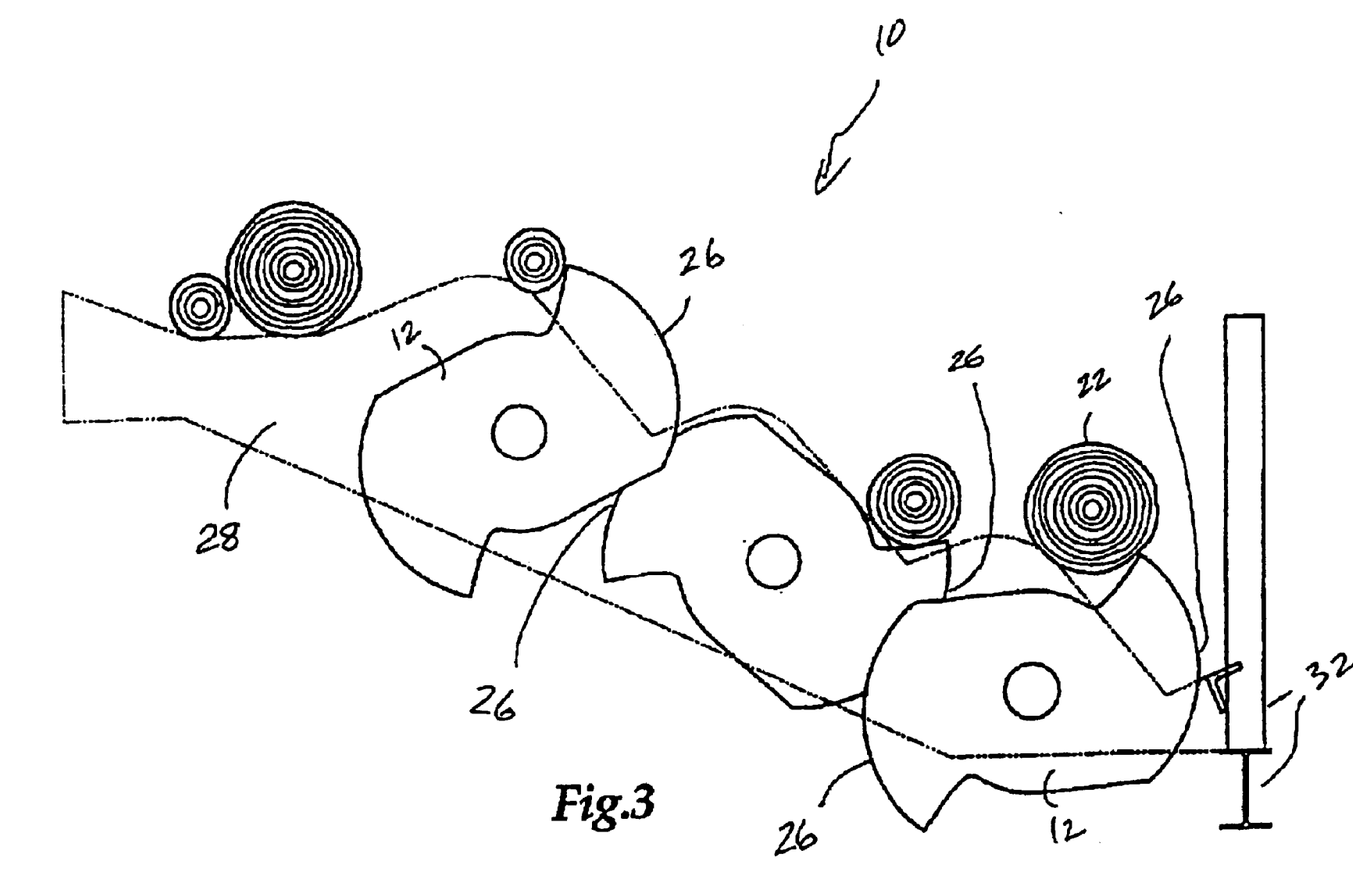
FIG. 3 is a side elevation view of the log singulator of FIG. 1.
Figure 4:
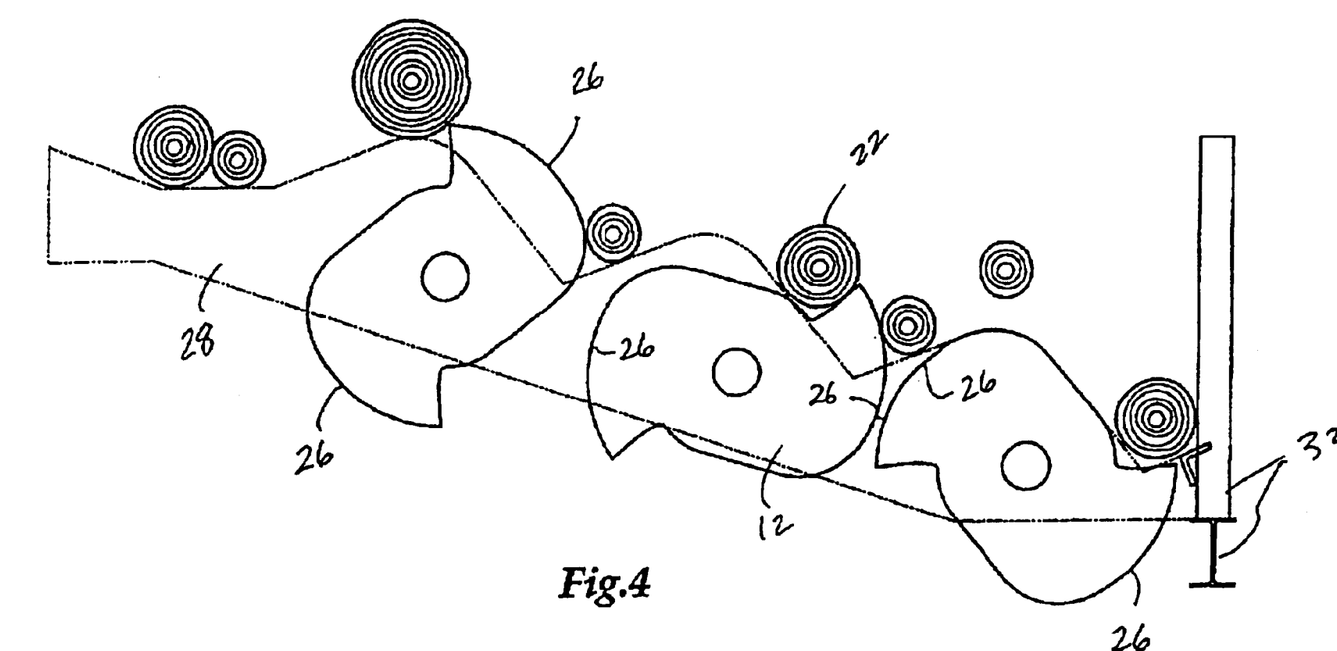
FIG. 4 is a side elevation view of a log singulator according to another embodiment of the present invention.

In another embodiment of the present invention, shown in FIG. 3, the lifter arms 12 have a different design so that the tips 26 of the lifter arms 12 overlap each other requiring that the lifter arms 12 be disposed off-center from each other in order to move logs downstream the log singulator in order to allow the tips 26 to clear each other. Alternatively, the lifter arms 12 can be spaced apart so that the tips 26 thereof do not overlap, as shown in FIG. 4. Thus, the tips 26 of the lifter arms 12 can clear each other without being disposed off-center from each other.

Figure 5:
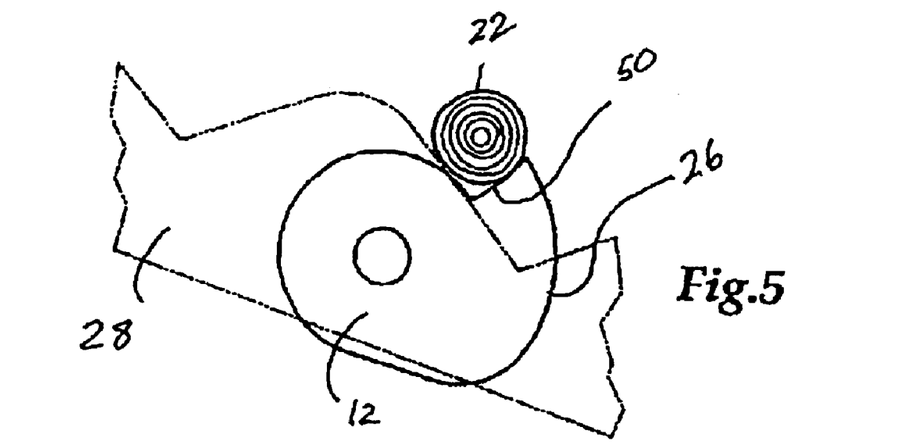
FIG. 5 is a side elevation view of a lifter arm according to one embodiment of the present invention.
Figure 6:
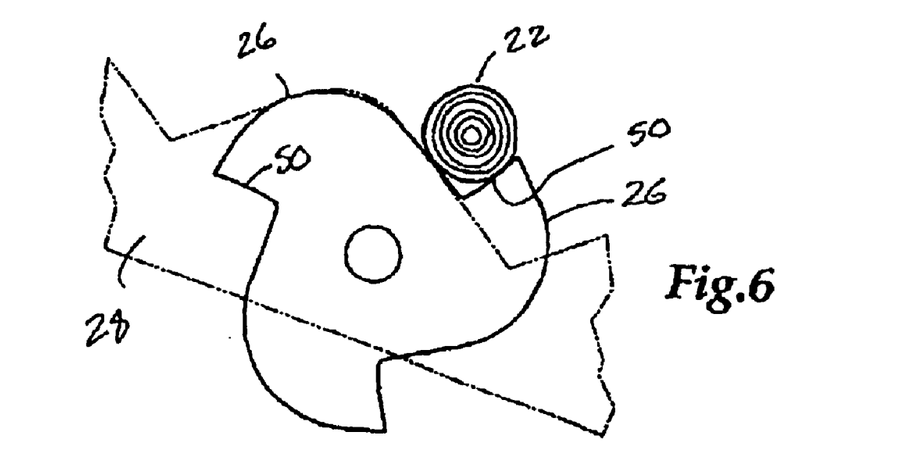
FIG. 6 is a side elevation view of a lifter arm according to another embodiment of the present invention.
Figure 7:
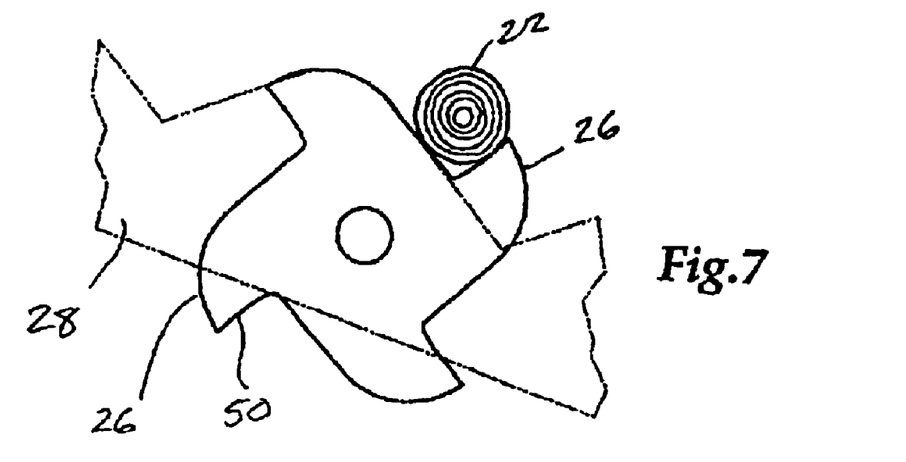
FIG. 7 is a side elevation view of a lifter arm according to yet another embodiment of the present invention.

The lifter arms 12 can have any number of tips 26. For example, each lifter arm 12 can have only one tip 26, which has only one face 50 for contacting the logs 22, as shown in FIG. 5. Alternatively, each lifter arm 12 can have three tips 26 and, thus, three faces 50 with which to contact the logs 22, as shown in FIG. 6. FIG. 7 illustrates a lifter arm 12 that has four tips 26 and four faces 50 with which to contact the logs 22.

Figure 8:
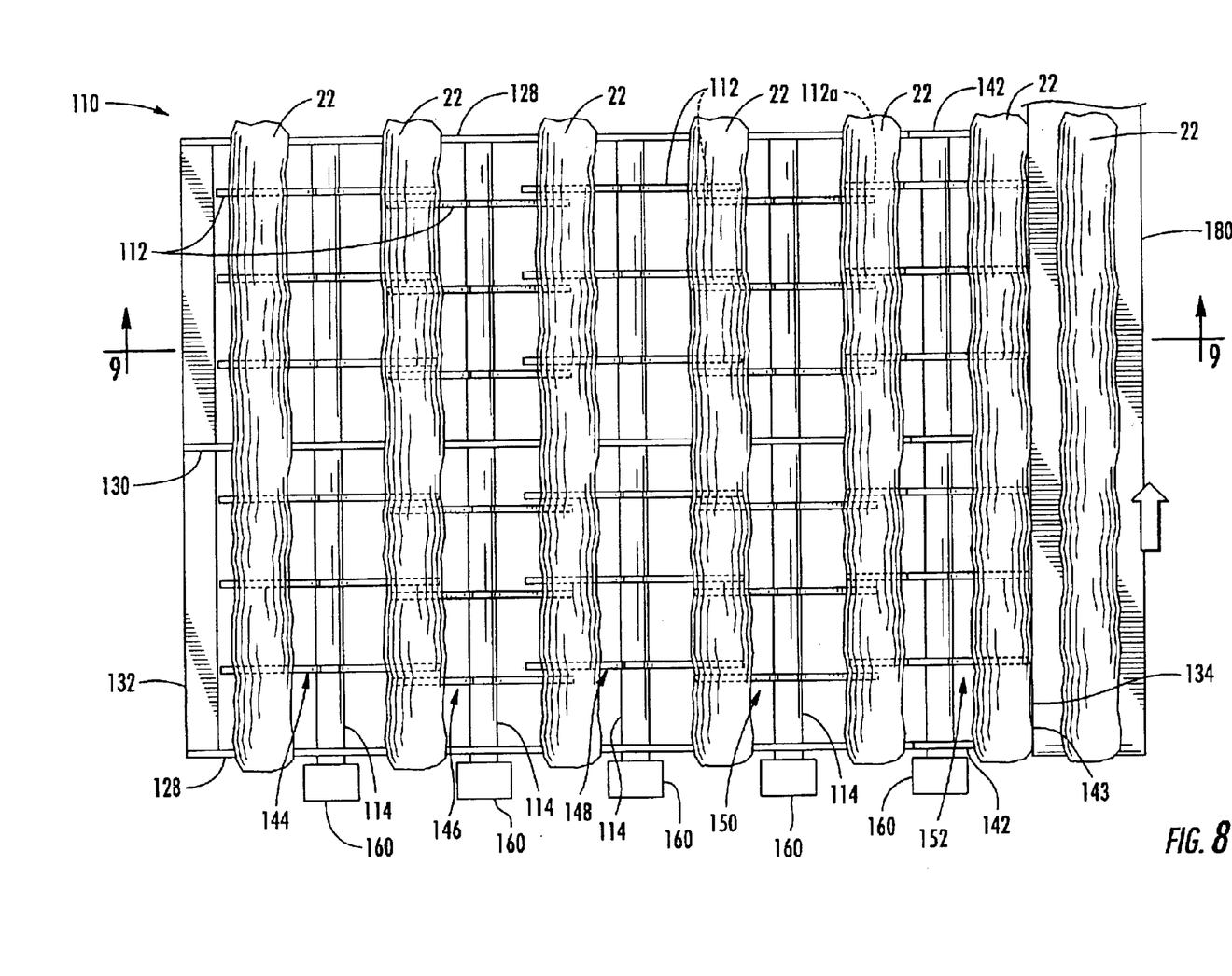
FIG. 8 is a plan view illustrating a log singulator according to another embodiment of the present invention.
Figure 9:
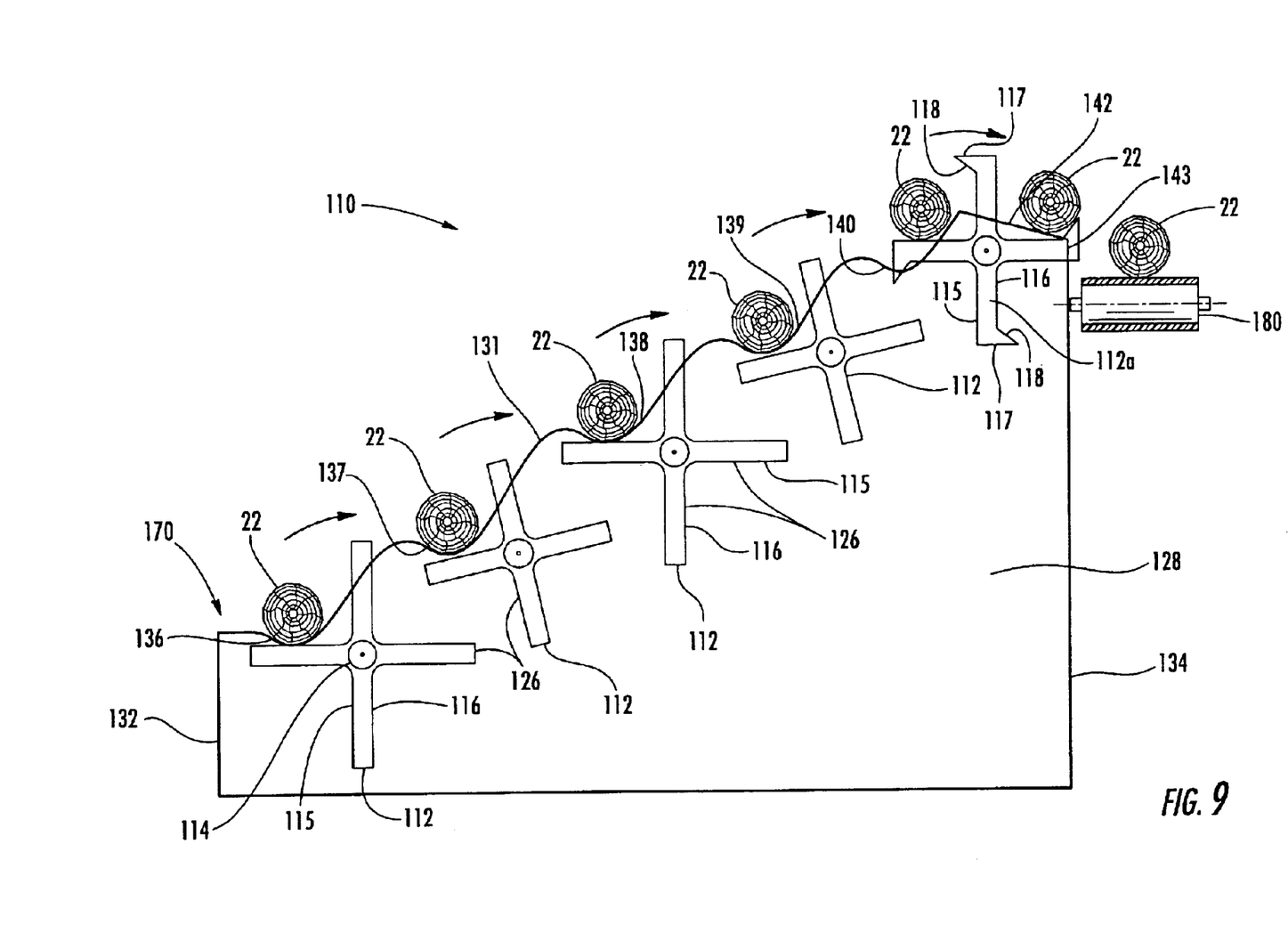
FIG. 9 is section view in elevation illustrating the log singulator of FIG. 8 as seen along line 9—9 of FIG. 8.

Referring now to FIGS. 8 and 9, there is shown a log singulator 110 according to another embodiment of the present invention that has multiple lifters 112 installed thereon. The lifters 112 are mounted on rotatable axles 114, for example, in sets 144, 146, 148, 150, 152 so that each set 144, 146, 148, 150, 152 of the lifters 112 shares a common rotational axis defined by the respective axle 114. Any number of sets of the lifters 112 can be used, and each set 144, 146, 148, 150, 152 can include any number of lifters 112, for example, between 1 and 20. The multiple axles 114 are generally parallel to one another and extend between a pair of sidewalls 128 and through one or more vertical support members 130 that are held in place by first and second cross members 132, 134 on first and second ends of the log singulator 110, respectively. The axles 114 can be journalled through, or otherwise supported by, the sidewalls 128 and support members 130, and bearings can be provided at the intersection of each axle 114 and sidewall 128 or support member 130 to facilitate the rotation of the axles 114. One or more rotational actuators 160, such as electric or hydraulic motors, can be provided in communication with the axles 114 for rotating the axles 114 and, hence, the lifters 112. The rotational actuators 160 can be configured to rotate the axles 114 in either or both directions.

The top edges 131 of the sidewalls 128 and the support members 130 can collectively form a log cradle structure 170 along which the logs 22 can be sequentially and individually conveyed in a lateral direction that is generally perpendicular to the major axes of the logs 22. The log cradle structure 170 can define any number of cradles 136, 137, 138, 139, 140 for sequentially receiving the logs 22 as the logs 22 are conveyed. As shown in FIG. 8, the log cradle structure 170 is inclined so that the logs 22 are lifted to successively higher positions while being conveyed horizontally. Thus, the logs 22 are moved in a successive, or stepwise, fashion from the first cradle 136 to the successively higher log cradles 137, 138, 139, 140 and then up to a discharge surface 142. In other embodiments, however, the logs cradles 137, 138, 139, 140 and the discharge surface 142 can alternatively be located at similar or descending heights.

The discharge surface 142 need not be a continuous surface and can be formed of a plurality of discharge surface portions disposed between the discharge lifters 112a, for example, the top edges 131 of the sidewalls 128 and support members 130. The discharge surface 142 can be disposed at a declined angle, i.e., a downward slope directed away from the singulator 110, so that the logs 22 tend to roll by gravity on the discharge surface 142 to an edge 143 or other discharge portion of the discharge surface 142. Further, the fifth set 152 of the lifters 112, hereinafter referred to as the discharge lifters 112a, can be configured to push the logs 22 along the discharge surface 142 to the edge 143. The logs 22 can be released from the discharge surface 142 to other machinery for further movement and/or processing. For example, the logs 22 can be laterally conveyed to the discharge surface 142 and released or discharged therefrom onto a conveyor 180. The conveyor 180 can be positioned proximate to the edge 143 of the discharge surface 142 so that the logs 22 are discharged from the surface 142 directly onto the conveyor 180. Also, the conveyor 180 can extend in a direction generally parallel to the axial direction of the logs 22 so that the conveyor 180 translates the logs 22 in a direction generally parallel to the major axes of the logs 22. The use of conveyors for translating logs is known in the art, for example, to move the logs 22 linearly to or through a saw mill for processing.

As shown in FIG. 9, each of the lifters 112, 112a has four arm members 126, which extend generally radially outward from the axle 114 on which the lifter 112, 112a is mounted, though other numbers of the arm members 126 can be provided on each lifter 112, 112a. Each arm member 126 defines a leading side 115 and a trailing side 116. The leading side 115 generally precedes the trailing side 116 as the lifters 112, 112a are rotated. Thus, the leading sides 115 of the arm members 126 typically contact or engage the logs 22 to push the logs 22 successively along the log cradle structure 170. The trailing sides 116 of the arm members 126 of some or all of the lifters 112, 112a can define cam portions 117 that extend from the trailing sides 116, i.e., in a direction generally opposite to the direction of motion of the respective arm member 126. Each cam portion 117 can define a cam surface 118 that defines an angle relative to the trailing side 116 or the general direction of extension of the arm member 126. For example, the cam surface 118 can be disposed at an angle of between about 30 and 50 degrees relative to the trailing side 116 of the arm member 126 as shown in FIG. 9. The cam portions 118 can be provided on all of the arm members 126 or only some, for example, only on the arm members 126 of the discharge lifters 112a as shown in FIG. 9.

The lifters 112, 112a can be configured so that the arm members 126 of the lifters 112, 112a are adjusted alternately to raised and lowered positions as the lifters 112, 112a rotate. Each arm member 126 can extend above the log cradle structure 170 when in the raised position and, each arm member 126 can extend substantially below the log cradle structure 170, i.e., below the top edges 131 of the sidewalls 128 and/or support members 130, in the lowered position. Further, as the arm members 126 of the discharge lifters 112a are rotated from the raised position to the lowered position, the cam portions 117 extend above the log cradle structure 170 and retain the logs 22 on the discharge surface 142 until the discharge lifters 112a reach a release position. The cam portions 117 can be configured to extend to about the edge 143 of the discharge surface 142 when the respective arm members 126 are rotated to the release position such that the cam surfaces 118 release the logs 22 when the logs 22 are positioned at about the edge 143 of the discharge surface 142. For example, when one of the arm members 126 of the discharge lifter 112a pushes one of the logs 22 onto the discharge surface 142, the cam portion 117 of the arm member 126 that is next in the rotational direction of the lifter 112a extends above the top edge 131 of the discharge surface 142 and retains the log 22 thereon. As the discharge lifter 112a continues to rotate (clockwise in FIG. 9, as indicated), the cam portion 117 retaining the log 22 moves toward the edge 143 so that the log 22 rolls to the release position. Proximate to the edge 143, the cam portion 117 rotates below the discharge surface 142, releasing the log 22 from the discharge surface 142. Thus, the logs 22 can be controllably released or discharged from the discharge surface 142 and placed on a predetermined portion of the conveyor 180 and/or at a predetermined time. For example, the singulator 110 can be used to precisely discharge the logs 22 onto the conveyor 180 with a predetermined gap, or no gap, between the successive logs 22.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A log singulator for conveying logs and controllably discharging the logs therefrom, the singulator comprising:

a plurality of rotatable lifters including at least one discharge lifter, each lifter having a rotational axis and a plurality of arm members extending generally radially outward therefrom, each arm member defining a leading side for engaging the logs, the axes of the lifters being spaced apart in a direction extending between first and second ends of the singulator such that rotation of the lifters rotates the arm members between raised and lowered positions and conveys the logs successively from the first end of the singulator to the at least one discharge lifter at the second end of the singulator; and a discharge surface extending proximate to the at least one discharge lifter and configured to receive the logs from the at least one discharge lifter, wherein each arm member of the at least one discharge lifter defines a trailing side and a cam surface disposed at an angle relative to the trailing side, such that the cam surfaces contact and retain the logs on the discharge surface until the logs have reached a predetermined release position on the discharge surface, such that the logs can be controllably discharged from the discharge surface.

2. A log singulator according to claim 1 wherein each arm member of each discharge lifter defines a cam portion that extends from the trailing side of the arm member in a direction generally opposite to the direction of motion of the arm member, the cam portion defining the cam surface at an angle of between about 30 and 50 degrees with the trailing side of the arm member.

3. A log singulator according to claim 1 wherein the discharge surface defines a downstream edge and each cam surface of a respective arm member extends to about the edge of the discharge surface when the respective arm member is rotated to a release position such that the cam surfaces release the logs when the logs are positioned at about the edge of the discharge surface.

4. A log singulator according to claim 1 further comprising a log cradle structure extending at an inclined angle and defining a plurality of cradles for receiving the logs while the logs are conveyed by the lifters, each arm member in the raised position extending above the log cradle structure and each arm member in the lowered position extending below the log cradle structure such that the logs are conveyed horizontally and lifted by the arm members between successive cradles of the log cradle structure.

5. A log singulator according to claim 1 wherein the discharge surface extends at a declined angle such that a log conveyed to the discharge surface by a respective arm member tends to roll toward the release position, the log being retained on the discharge surface by the cam surface of the arm member next in the rotational direction of the lifter.

6. A log singulator according to claim 1 wherein each lifter defines a trailing side defining a cam surface at an angle relative thereto.

7. A log singulator according to claim 1 further comprising a rotational actuator in communication with the lifters for rotating the lifters and thereby conveying the logs.

8. A log singulator according to claim 1 wherein the lifters are arranged in sets of at least two, each set of lifters being collinearly arranged such that the logs are conveyed concurrently by the lifters of each set to at least two discharge lifters.

9. A log singulator according to claim 8 wherein the discharge surface is formed of a plurality of discharge surface portions disposed between the discharge lifters.

10. A log singulator according to claim 1 wherein each lifter is rotatable through a range of motion of at least 360 degrees.

11. A log singulator according to claim 1 wherein each lifter has at least three of the arm members.

12. A log singulator for conveying logs and controllably discharging the logs therefrom, the singulator comprising:
- a plurality of rotatable lifters including at least one discharge lifter, each lifter having a rotational axis and a plurality of arm members extending generally radially outward therefrom, each arm member defining a leading side for engaging the logs and a trailing side, the axes of the lifters being spaced apart in a direction extending between first and second ends of the singulator such that rotation of the lifters rotates the arm members between raised and lowered positions and conveys the logs successively from the first end of the singulator to the at least one discharge lifter at the second end of the singulator;
- a rotational actuator in connection with the lifters for rotating the lifters and thereby conveying the logs;
- a log cradle structure extending at an inclined angle and defining a plurality of cradles for receiving the logs while the logs are conveyed by the lifters, each arm member in the raised position extending above the log cradle structure and each arm member in the lowered position extending below the log cradle structure such that the logs are conveyed horizontally and lifted by the arm members between successive cradles of the log cradle structure; and
- a discharge surface extending proximate to the discharge lifter and configured to receive the logs while the logs are being conveyed by the at least one discharge lifter, the discharge surface extending at a declined angle such that each log conveyed to the discharge surface by a respective arm member of the discharge lifter tends to roll toward a discharge position, the log being retained on the discharge surface by the cam surface of the arm member next in the rotational direction of the lifter,
- wherein each arm member of the discharge lifter defines a cam surface disposed at an angle relative to the trailing side of the arm member such that the cam surfaces contact and retain the logs on the discharge surface until the logs have reached a predetermined release position on the discharge surface, such that the logs can be controllably discharged from the discharge surface.

13. A log singulator according to claim 12 wherein each arm member of the discharge lifter defines a cam portion that extends from the trailing side of the arm member in a direction generally opposite to the direction of motion of the arm member, the cam portion defining the cam surface at an angle of between about 30 and 50 degrees with the trailing side of the arm member.

14. A log singulator according to claim 12 wherein the discharge surface defines an edge and each cam surface of a respective arm member extends to about the edge of the discharge surface when the respective arm member is rotated to a release position corresponding to the release position of the logs such that the cam surfaces release the logs when the logs are positioned at about the edge of the discharge surface.

15. A log singulator according to claim 12 wherein each lifter defines a trailing side defining a cam surface at an angle relative thereto.

16. A log singulator according to claim 12 wherein the lifters are arranged in sets of at least two, each set of lifters being collinearly arranged such that the logs are conveyed concurrently by the lifters of each set to at least two discharge lifters.

17. A log singulator according to claim 12 wherein each lifter is rotatable through a range of motion of at least 360 degrees.

18. A log singulator according to claim 12 wherein each lifter has at least three of the arm members.

19. A method of conveying logs, the method comprising:
- rotating a plurality of lifters such that a log is successively pushed by a leading side of radial arm members of a plurality of lifters and thereby conveyed along the lifters to at least one discharge lifter;
- rotating the at least one discharge lifter and thereby pushing the log with a leading side of a radial arm member of each discharge lifter onto a discharge surface;
- retaining the log on the discharge surface with a cam surface of a trailing edge of the arm member that is successively next in the rotational direction of each discharge lifter, the cam surface extending above the discharge surface; and
- rotating the at least one discharge lifter such that the cam surface is moved substantially below the discharge surface, thereby discharging the log from the discharge surface.

20. A method according to claim 19 wherein the third rotating step comprises rotating the discharge lifter to a release position wherein the cam surface extends proximate to an edge of the discharge surface such that the log is discharged from the edge of the discharge surface.

21. A method according to claim 19 further comprising depositing the log in successive cradles of a log cradle structure, the cradles located between the lifters to successively receive the logs during the first rotating step.

22. A method according to claim 19 wherein the first rotating step comprises depositing the logs singly in the cradles and the second and third rotating steps comprise singly discharging the logs from the discharge surface.

23. A method according to claim 19 wherein the third rotating step comprises discharging the log from the discharge surface at a predetermined time.

24. A method according to claim 23 wherein the third rotating step comprises coordinating the discharge of the log from the discharge surface with the movement of a conveyor such that the log is discharged from the discharge surface onto a predetermined portion of the conveyor.

* * * * *